United States Patent [19]

Noguchi

[11] Patent Number: 5,715,169
[45] Date of Patent: Feb. 3, 1998

[54] SOFTWARE RENTAL METHOD AND APPARATUS, AND CIRCULATING MEDIUM THEREFOR

[75] Inventor: Sunao Noguchi, Atsugi, Japan

[73] Assignees: CSK Research Institute Corp.; Sega Enterprises, Ltd., both of Tokyo, Japan

[21] Appl. No.: 373,653

[22] Filed: Jan. 17, 1995

[30] Foreign Application Priority Data

Mar. 7, 1994 [JP] Japan ................................. 6-036188

[51] Int. Cl.$^6$ ................................................. G06F 17/00
[52] U.S. Cl. ........................... 364/474.07; 364/479.04; 360/132; 395/201
[58] Field of Search ........................... 364/401 R, 401 M, 364/479, 408, 900, 474.04, 479.07; 235/379, 380; 395/226, 227, 201; 360/132

[56] References Cited

U.S. PATENT DOCUMENTS

| | | | |
|---|---|---|---|
| 4,593,376 | 6/1986 | Volk | 364/900 |
| 4,597,058 | 6/1986 | Izumi et al. | 364/900 |
| 4,683,372 | 7/1987 | Matsumoto | 235/492 |
| 4,746,787 | 5/1988 | Suto et al. | 235/379 |
| 4,766,294 | 8/1988 | Nara et al. | 235/380 |
| 5,029,034 | 7/1991 | Weiley | 360/132 |
| 5,162,989 | 11/1992 | Matsuda | 364/401 |

FOREIGN PATENT DOCUMENTS

| | | |
|---|---|---|
| 63-124152 | 5/1988 | Japan . |
| 3-501070 | 3/1991 | Japan . |
| 3-269446 | 12/1991 | Japan . |
| 3-290733 | 12/1991 | Japan . |
| 4-158441 | 6/1992 | Japan . |
| 5-210786 | 8/1993 | Japan . |

*Primary Examiner*—Jeffery Hofsass
*Assistant Examiner*—Albert K. Wong
*Attorney, Agent, or Firm*—McCormick, Paulding & Huber

[57] ABSTRACT

A software rental method is disclosed. A specific software and rental term information or permitted accumulative use time information of said specific software are written into a circulating medium. The software retained in the circulating medium is autonomously invalidated at a time point when a desired rental term defined by the rental term information expires or at a time point when an accumulative use period of time exceeds a limit defined by the permitted accumulative use time information. A cartridge used as a circulating medium for a rental software, comprises a counter to be set with a rental term. The counter is counted down in response to the clock signal from a clock generator. Access to a title storing memory unit in the cartridge is prohibited at a time point when the counter value becomes zero.

9 Claims, 14 Drawing Sheets

Fig. 13

→ HOW MANY RENTAL DAYS?

| 1 | 2 | 3 | 4 | 5 | 6 | 7 | 8 | 9 |

FEE ¥ 600

Cancel    OK

Fig. 14

→ PUT IN MONEY

FEE ¥ 600

MONEY INPUT ¥ 100

Cancel    OK

Fig. 15

→ Procedures finished.
  Wait until a manual and a receipt are printed

• Rental term is 3 days.

• At the end of the rental term, the program becomes unplayable.

• Please come again for renewal.

OK

SOFTWARE RENTAL METHOD AND APPARATUS, AND CIRCULATING MEDIUM THEREFOR

BACKGROUND OF THE INVENTION

1. Field of the Invention

This invention relates to a software rental technology and a circulating medium, and more particularly, to an effective technology to be applied to rental business of game softwares, computer softwares, audio softwares, video softwares and other softwares.

2. Related Art Statement

With a conventional software rental method, as seen in the video software rental business for example, it is general that a software is fixedly stored in a read-only circulating medium and rent to a user in the unit of the circulating medium, the rental term is controlled by the user himself in accordance with a lending slip issued from a rental shop to the user while the rental shop recording the information such as the time limit to be returned, and, if the medium is returned after the rental term, an additional fee is required.

From the viewpoint of a rental shop, in the conventional method described above, control of a rental term of a software depends substantially on a user, and there occurrs such a problem that the rental term cannot be controlled precisely. In addition, circulating mediums must be displayed at a shop by the number of softwares to be rented, unavoidably increasing floor or wall area needed for shop operation. As a result, installation location suitable for a rental shop will be restricted, and operational forms of the business are limited. Further, softwares popular to users are need to be stocked in large number in accordance with demand for them, which may raise such a problem that the softwares are not timely and effectively supplied to meet the demands. Further, persons must be posted in order to prevent theft of circulating mediums, resulting in increase in personnel cost for operating a rental shop.

On the other hand, from the viewpoint of a user, he must always be conscious of a rental term of a rented software, and, when the software is to be returned, he must go to a rental shop bringing a circulating medium containing the software, which is inconvenient to him.

SUMMARY OF THE INVENTION

An object of the present invention is to provide a rental technology which does not need any complicated procedure and can control a rental term of a software precisely.

Another object of the present invention is to provide a rental technology which requires only small space and low cost and can realize a wide variety of operational forms of the business.

Further object of the present invention is to provide a rental technology whereby software can be commercially distributed so as to meet demand exactly.

Further object of the present invention is to provide a circulating medium for renting a software, which is capable of controlling a rental term precisely without requiring any complicated procedure.

The above and other objects and novel features of the present invention will be made apparent in the following description in conjunction with the attached drawings.

A circulating medium for use with a system for renting software according to the invention comprises first memory means for storing the software; second memory means for storing a permitted time period; counting means for counting an accumulative time period after the permitted time period is stored; counting control means for preventing the counting means from counting the accumulative time period while the circulating medium is not mounted in a software execution unit, and further for preventing the counting means from counting the accumulative time period while the circulating medium is mounted in the software execution unit and the software execution unit is not activated; and access control means for prohibiting access to the first memory means when the accumulative time period counted by the counting means corresponds to the permitted time period.

According to the software rental technology of the present invention, a rental term is controlled autonomously in a circulating medium, and therefore, on both lending and renting sides of a software, the rental term can be controlled precisely without being conscious of the rental term and performing complicated procedures such as the return of the circulating medium.

According to the circulating medium of the present invention, the rental term control means makes it possible to control autonomously and precisely a rental term of a software stored in the circulating medium based on rental term information or permitted accumulative use time information set into the circulating medium simultaneously with storing of the software. As a result, troublesome and complicated procedures such as the control of the rental term and the returning procedure which would be previously imposed upon a user of the software can be eliminated. The memory means of the circulating medium is rewritable, and therefore, the circulating medium can be used repeatedly by rewriting a software and rental term information or permitted accumulative use time information. Furthermore, provided that a user becomes an owner of the circulating medium by paying its price as a predetermined membership fee, for example, only content of a desired software is rented and the circulating medium need not be returned to a rental shop.

BRIEF DESCRIPTION OF THE DRAWINGS

FIG. 13 is an example of a display screen showing operation of the embodiment of the software rental method and apparatus according to the present invention;

FIG. 14 is an example of a display screen showing operation of the embodiment of the software rental method and apparatus according to the present invention;

FIG. 15 is an example of a display screen showing operation of the embodiment of the software rental method and apparatus according to the present invention;

DETAILED DESCRIPTION OF THE PREFERRED EMBODIMENTS

Figure 1:
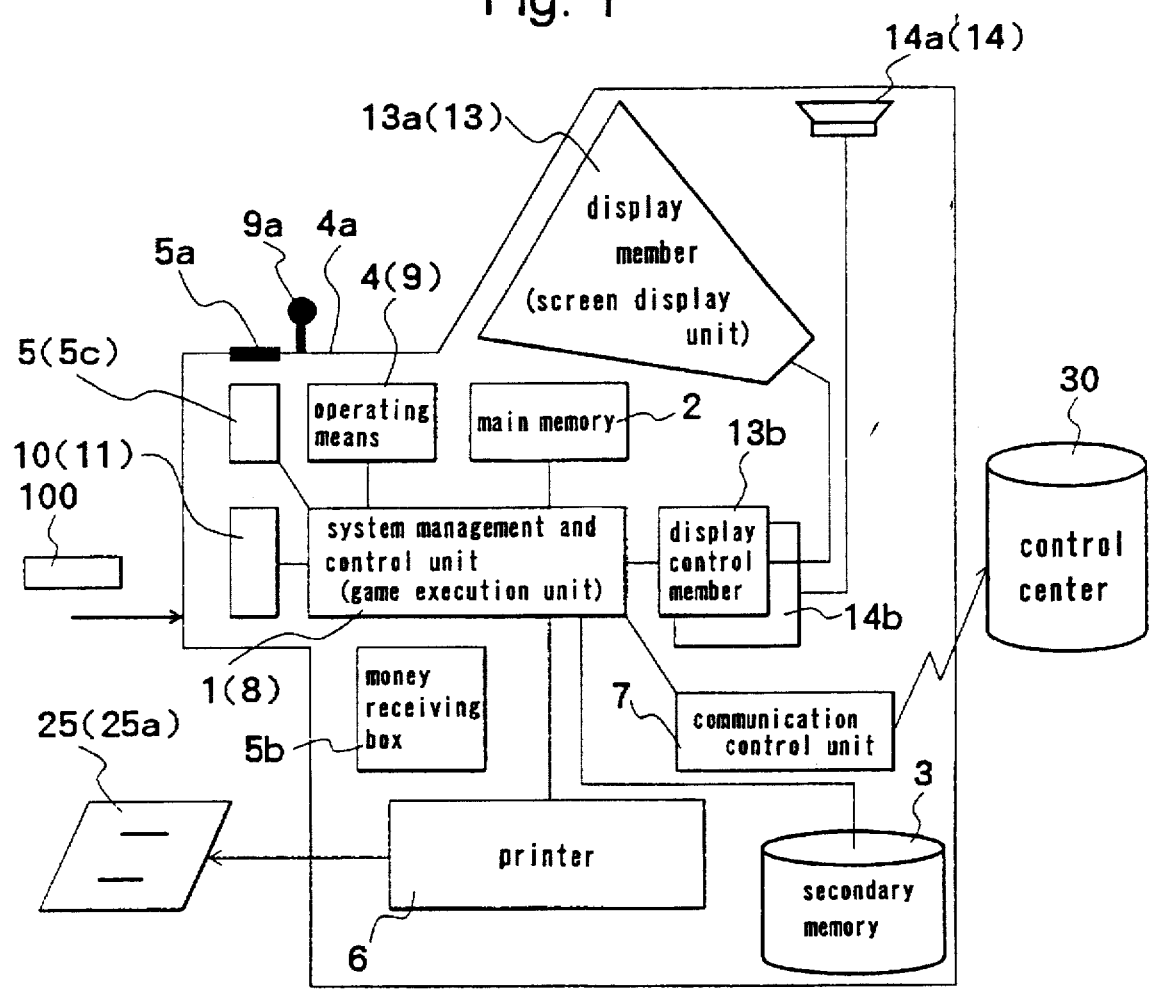
FIG. 1 is a block diagram showing structure of an embodiment of a software rental apparatus according to the present invention.

Embodiments of the present invention are described below referring to the drawings.

[EMBODIMENT 1]

Figure 2:
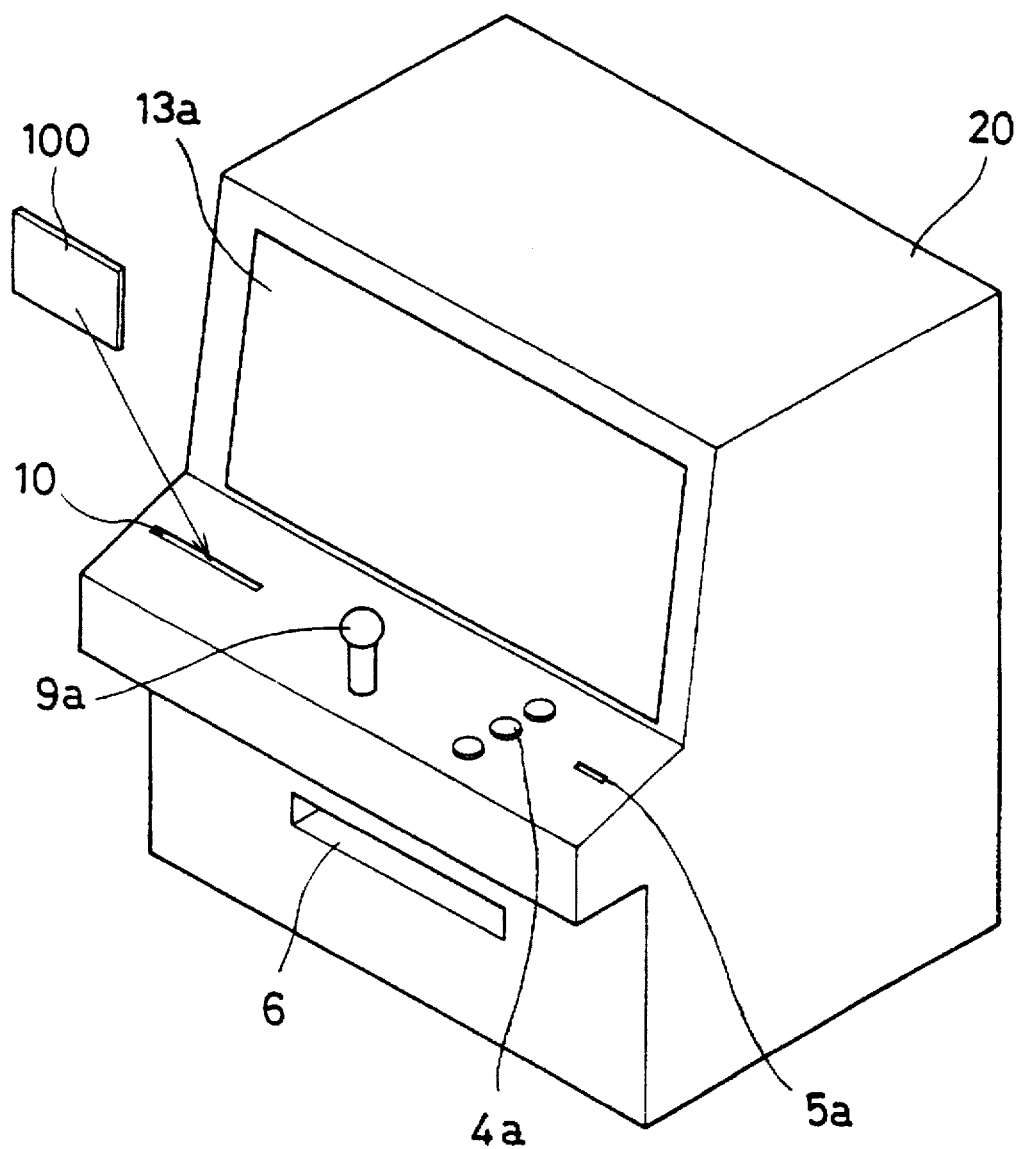
FIG. 2 is an external perspective view of the apparatus shown in FIG. 1.

FIG. 1 is a block diagram of an embodiment of the software rental apparatus according to the present invention; FIG. 2 is an external perspective view of the software rental apparatus of FIG. 1; and FIG. 3 is a block diagram showing an example of a system configuration of the apparatus of FIG. 1.

In the following, description will be made with reference to game softwares as an example of softwares to be rented or sold out.

Figure 3:
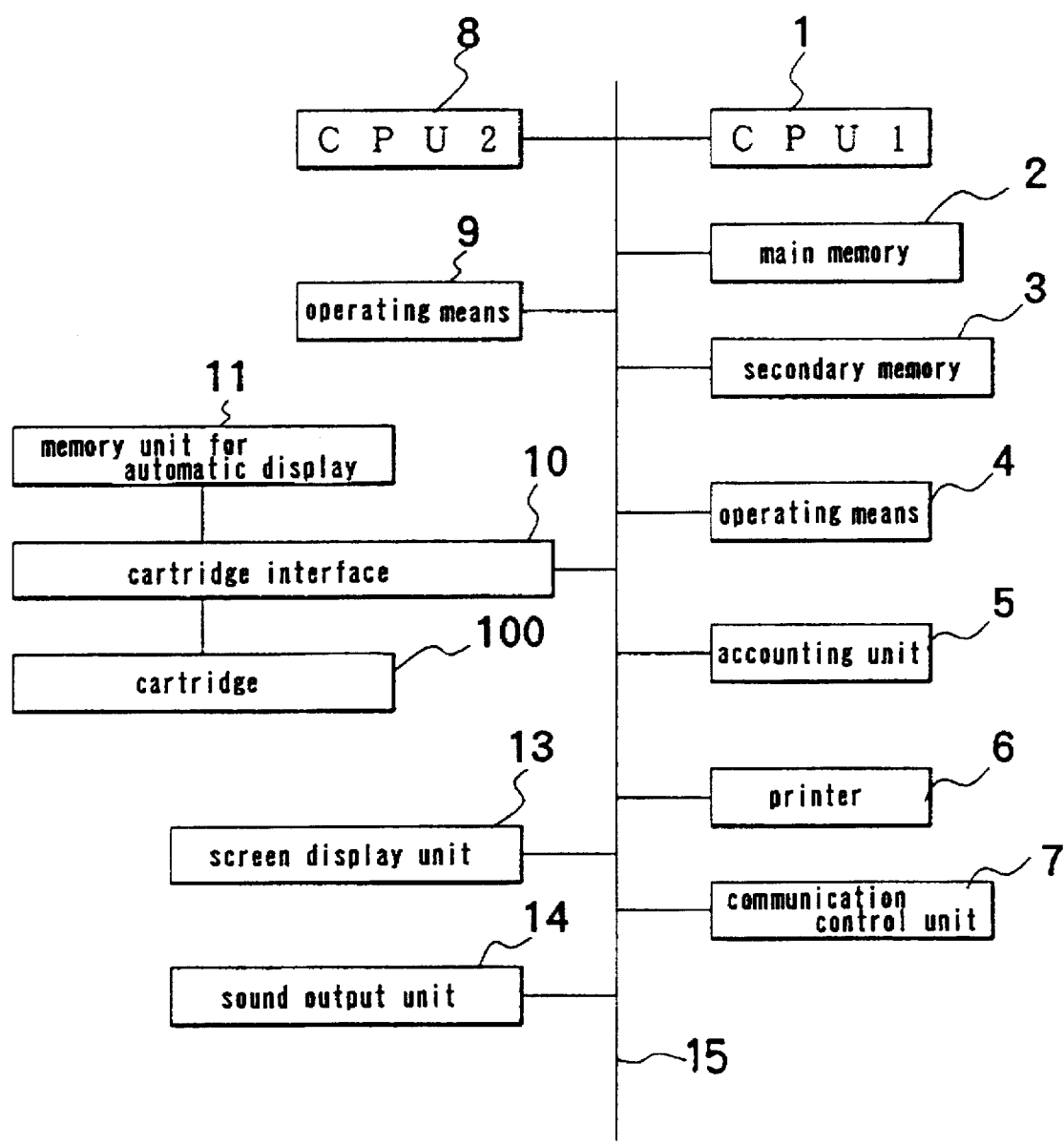
FIG. 3 is a block diagram showing an example of the system configuration of the apparatus.

As shown in FIG. 3, in the system configuration of the software rental apparatus, to a system bus 15, are connected:

a system management and control unit 1 (CPU 1) for total control;

a main memory 2 for storing a control program which is executed by the system management and control unit 1 and performs rental processings as described latter;

a secondary memory 3 for storing a plurality of softwares (hereinafter called "titles") to be rented, control programs and the like;

an operating means (for example, a keyboard) 4 comprising a set of keys 4a and the like for operating the system management and control unit 1;

an accounting unit 5 for collecting a rental fee or sale price of a title to be rented or sold out;

a printer 6 for printing a manual 25 of the title and a form 25a showing transaction results of rental or sale;

a cartridge interface 10 for exchanging information with a cartridge 100 as a circulating medium which is a portable storage medium for storing a title;

a screen display unit 13 for displaying control information or a game screen during trial use;

a sound output unit 14 for outputting sound; and the like.

Further in the present embodiment, to the system bus 15, are connected also a game execution control unit 8 (CPU 2) comprising a CPU for actually executing a title for demonstration or trial use and an operating means 9 comprising a joystick 9a and the like for game operation. A memory unit 11 for automatic display is connected to the cartridge interface 10. When a title is to be executed for demonstration or trial, the memory unit 11 is loaded with the title and accessed by the game execution control unit 8.

As shown in FIGS. 1 and 2, the accounting unit 5 comprises a money inlet 5a, a money receiving box 5b, and an accounting interface 5c for controlling money receipt and delivery.

The screen display unit 13 comprises a display member 13a such as a cathode ray tube (CRT) and a display control member 13b for controlling the display member 13a. Similarly, the sound output unit 14 comprises a speaker 14a and a speaker control member 14b.

Furthermore, if necessary, a communication control unit 7 may be connected to the system bus 15, whereby the apparatus can access to a data base or the like provided in a control center 30 located remotely and externally from the software rental apparatus for receiving delivery of new titles to be stored in the secondary memory 3 or updating the titles in the memory 3 for version-up; for collecting, from the control center 30, various information on marketing statistics etc. obtained from rental or selling processes of the titles; and for performing maintenance and control of hardware or control programs of the software rental apparatus by remote operation; and the like.

Figure 4:
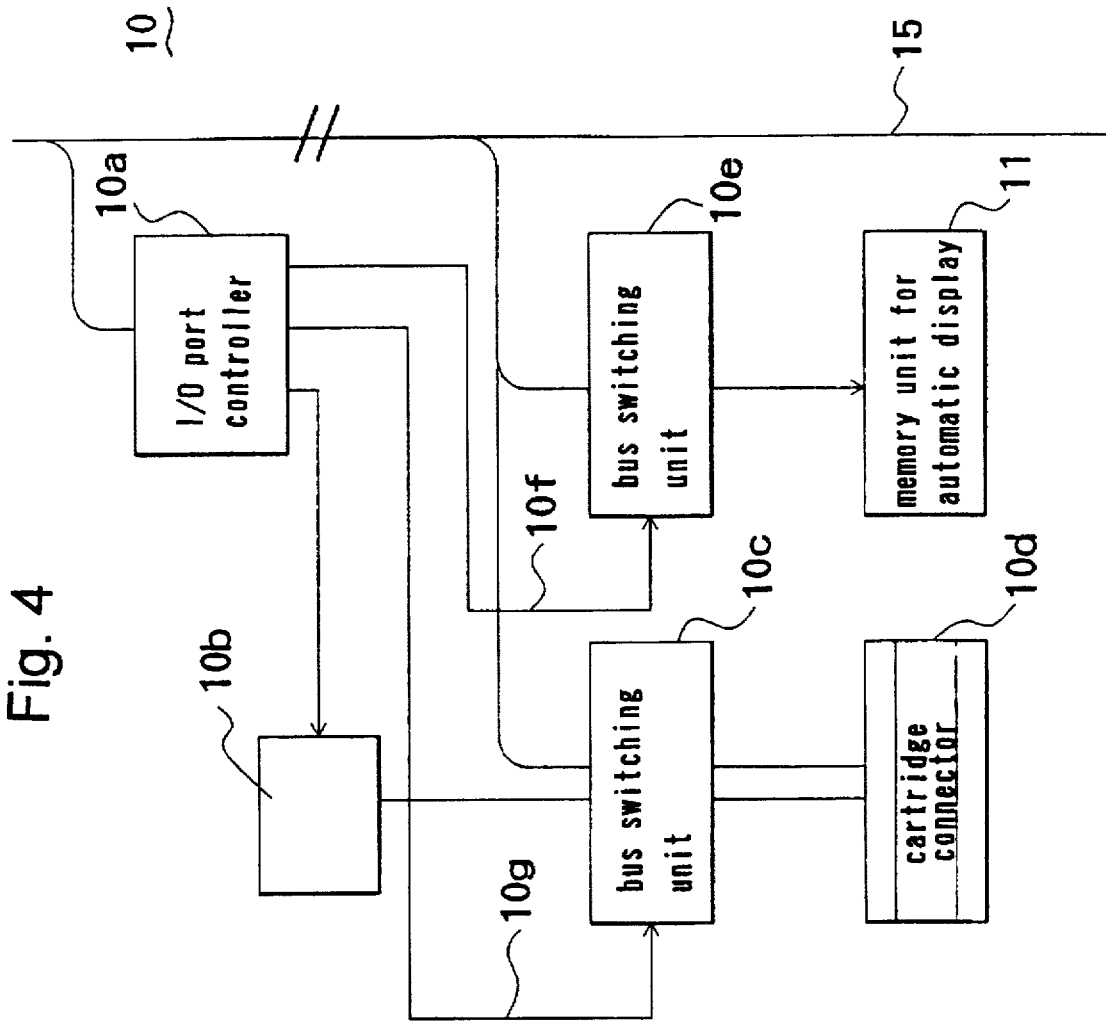
FIG. 4 is a block diagram showing an example of a cartridge interface of the apparatus.

FIG. 4 is a block diagram showing an example configuration of the cartridge interface 10.

In FIG. 4, the memory unit 11 for automatic display and a cartridge connector 10d are connected to the system bus 15 through bus switching units 10e and 10c respectively. The operations of the bus switching units 10e and 10c are respectively controlled in response to bus switching signals 10f and 10g received from an I/O port controller 10a. Also, the bus switching unit 10c on the side of the cartridge connector 10d is provided with a cartridge writing power source 10b to supply electric power for performing writing operation on the cartridge 100 mounted in the cartridge connector 10d, the writing operation being described later.

Next, an example configuration of the cartridge 100 used in the software rental apparatus of the present embodiment is explained with reference to FIGS. 5 and 6.

Figure 5:
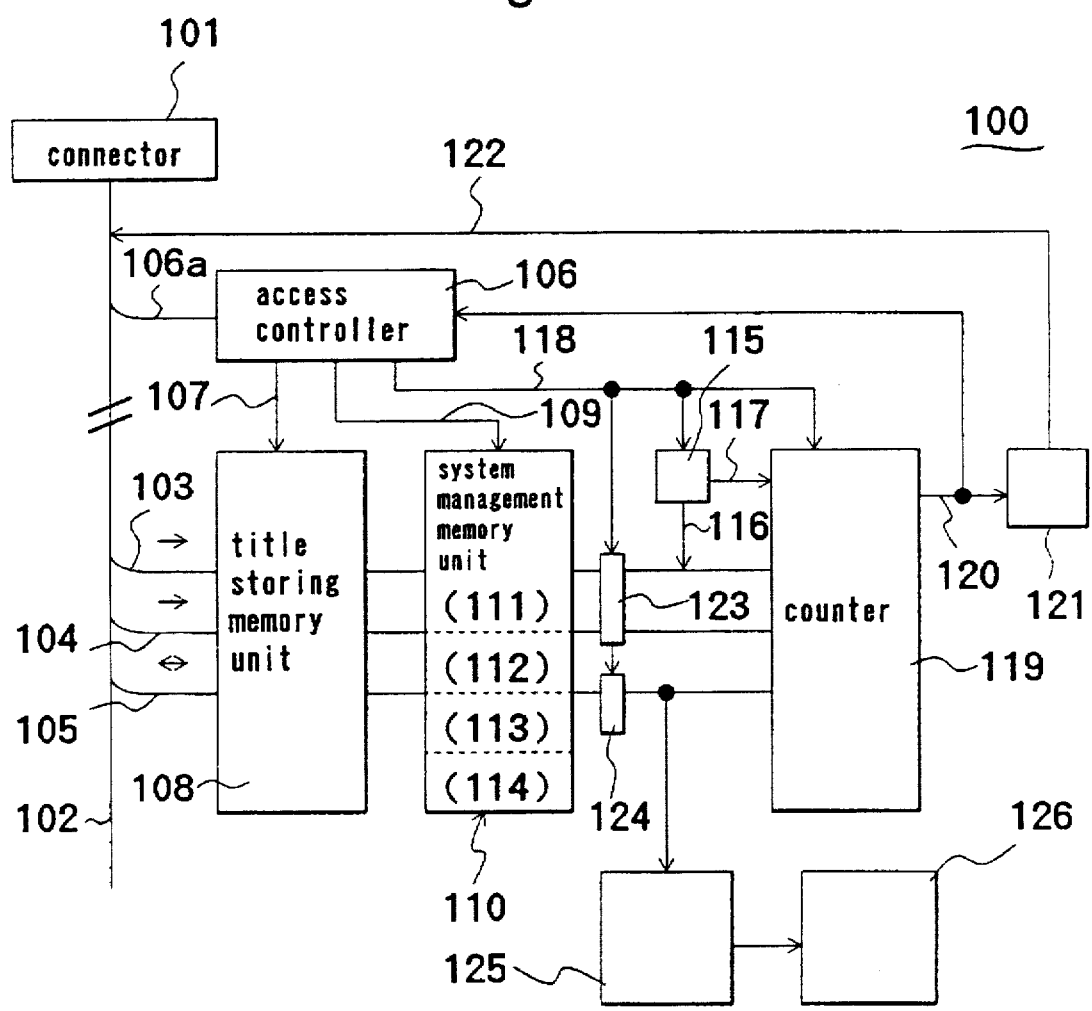
FIG. 5 is a block diagram showing an embodiment of internal structure of the circulating medium according to the present invention.
Figure 6:
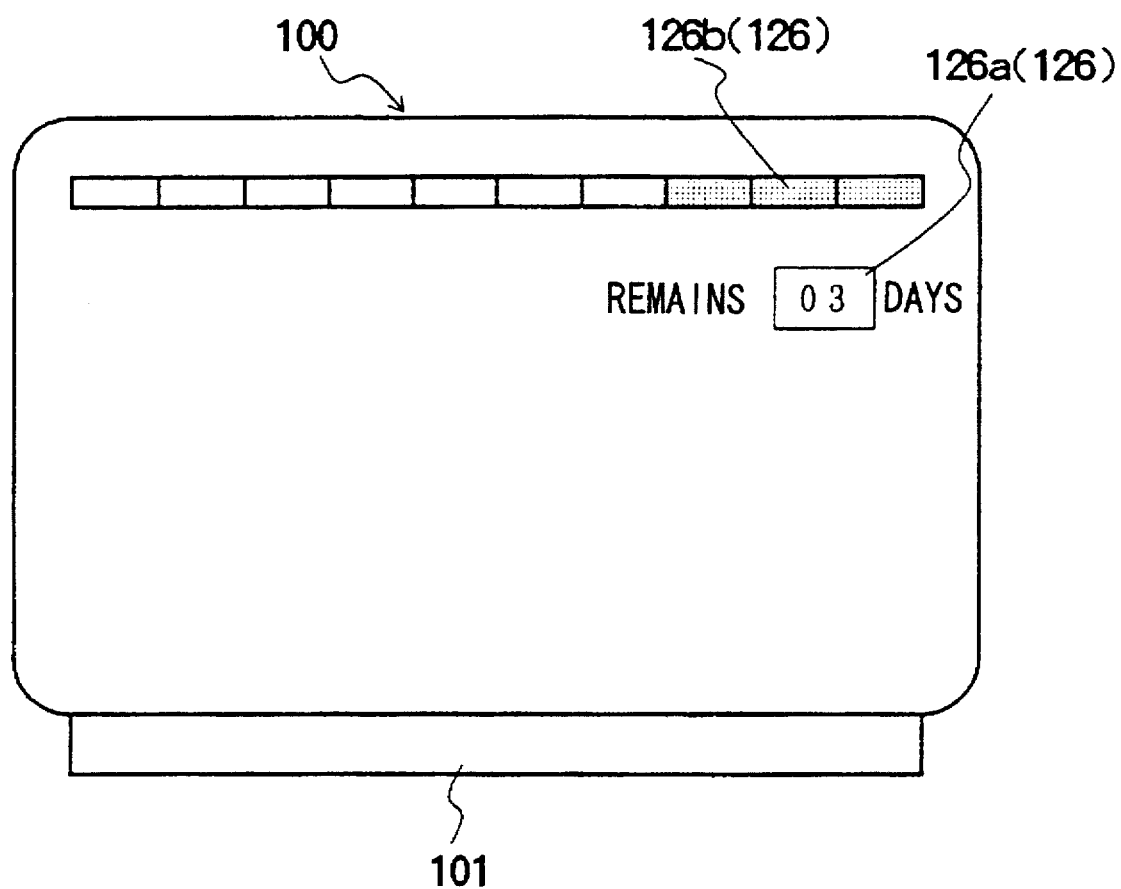
FIG. 6 is a schematic plan view showing an example of an external appearance of the circulating medium.

FIG. 5 is a block diagram showing an internal configuration of the cartridge 100 of the present embodiment, and FIG. 6 is a schematic plan view showing an example of an external appearance thereof.

As shown in FIG. 5, in the cartridge 100, a bus 102 is connected to a connector 101 and includes a control bus 103, an address bus 104 and a data bus 105. To the bus 107, is connected a title storing memory unit 108 (a first region of a rewritable memory means), a system management memory unit 110 (a second region of the rewritable memory means) and a counter 119. Access to these units 108, 110 and counter 119 is controlled respectively in response to access enabling signals 107, 109 and 118 issued by an access controller 106.

Between the-system management memory unit 110 and the counter 119, the control bus 103, the address bus 104 and the data bus 105 are provided with a bus buffer 123 and a direction-controlled bus buffer 124, which are operated by the access enabling signal 118 from the access controller 106.

The counter 119 is counted down in response to a clock signal 117 output from a clock generator 115 whose operation is controlled in response to the access enabling signal 118. When the counter value becomes zero, a time-expiration signal 120 is output to the access controller 108. The time-expiration signal 120 is also supplied to a reset pulse generator 121, which in turn sends the time-expiration signal 120 to a CPU of a software execution/reproduction unit not shown through a reset control line 122 constituting a part of the bus 102.

Also, the counter 119 is connected to a counter value decoder 125 and then to a counter value display unit 126 through the data bus 105. The clock generator 115 also generates and outputs a counter value read-out pulse 116 to the counter 119 through the control bus 103. Each time the counter 119 receives the counter value read-out pulse 116, the content of the counter 119 is read out and sent to the counter value decoder 125.

The counter value display unit 126 comprises, for example, of a character display device 126a of the liquid crystal type or seven-segment type, or a graph display device 126b displaying the value of the counter 119 in an analog manner as in the case of an audio level meter. The counter value decoder 125 converts the value of the counter 119 by means of a predetermined algorithm depending on which type of the display devices is employed, and sends the converted value to the counter value display unit 126. Although, FIG. 6 shows the case where both of the character display device 126a and the graph display device 126b are provided on the side surface of the cartridge 100 for the sake of simplicity of illustration, it is sufficient if only one of them is provided.

Referring to FIG. 5 again, in the present embodiment, the title storing memory unit 108 is made of programmable ROM such as a flash memory (flash EEPROM). As a result, a title stored in the momory unit 108 can be held in a nonvolatile manner and are rewritable at any time.

Similarly, the system management memory unit 110 also is made of programmable ROM such as flash memory. In this case, the system management memory unit 110 is used in blocks: namely, a time-expiration message storing block 111 for storing a message display program to be executed by the software execution/reproduction unit (not shown) which is reset in response to the time-expiration signal 120 of the counter 119;

a user identification code storing block 112 for identifying an owner of the cartridge 100;

a user information storing block 113 for storing management information on, for example, a state of use by a user; and an access times recording block 114 for recording accumulative number of times of accesses to the title storing memory unit 108 etc.

A flash memory has a predetermined upper limit to the number of rewritable times with a predetermined reliability. As a result, with the title storing memory unit 108 constructed from a flash memory, reliability can be maintained by controlling the upper limit of the number of rewriting by recording the number of accesses in the access times recording block 114.

Furthermore, though not shown, the cartridge 100 is provided in its inside with a power source section comprising a chargeable secondary cell in order to supply operating power to the access controller 106, the clock generator 115, the counter 119, the reset pulse generator 121, the counter value decoder 125 and the counter value display unit 126.

And, when the cartridge 100 is mounted onto the software rental apparatus of the present embodiment or the game execution unit (the software execution/reproduction unit) not shown, the power source section is charged through power source pins provided in the connector 101.

Now, the operation of thus-constructed cartridge 100 is explained with reference to FIG. 5.

Control of access to the counter 119 is performed as follows. First, the control bus 103 to the counter 119 is made active and the address where the counter 119 is mapped is designated through the address bus 104. By this, the counter 119 is selected (the access enabling signal 118 becomes active), and the bus buffer 123 and the direction-controlled bus buffer 124 are opened. Then, a write signal or a read-out signal is supplied through the control bus 103 to the counter 119. In the writing case, a data value which has been set is output onto the data bus 105. During the access to the counter 119, the output of a counter value readout pulse 116 from the clock generator 115 to the counter 119 is stopped. Other than under the above-described operation, the bus buffer 123 and the direction-controlled bus buffer 124 are closed, and as a result, access to the counter 119 is prohibited.

The time limit control operation by the counter 119 (rental term control operation of the present embodiment) is performed as follows. The set value of the counter 119 is counted down by a clock signal 117 of a predetermined frequency from the clock generator 115 and, when the counter value becomes zero, the time-expiration signal 120 is made active. In response, the access controller 106 prohibits the access to the title storing memory unit 108 to invalidate the title (software) stored in the title storing memory unit 108, and simultaneously makes it possible to access to the system management memory unit 110. At the same time, the reset pulse generator 121 outputs a reset pulse to a reset control line 122. In the case that the cartridge 100 is mounted onto the software execution/reproduction unit not shown and the game of the title stored in the title storing memory unit 108 is in execution, such execution is reset and an execution address is set to a time-expiration message storing block 111 of the system management memory unit 110 and a message informing the interruption of the game due to the expiration of rental term is displayed on the screen of the software execution/reproduction unit not shown.

While a stored title is executed, control of access to the title storing memory unit 108 is performed as follows. In the case that the content of the counter 119 is not zero and the time-expiration signal 120 is not active, an address designated through the address bus 104 from the outside corresponds to the address of the title storing memory unit 108. By this, only the title storing memory unit 108 becomes operable, and the others including the system management memory unit 110 and the counter 119 cannot be "seen" from the bus 102. Under this state, when the time-expiration signal 120 of the counter 119 becomes active, the access controller 106 inactivates the access enabling signal 107 to the title storing memory unit 108, thus making it impossible to access to the title storing memory unit 108 through the bus 102, and invalidating the title (software) stored in the memory unit 108.

Next, control of access to the system management memory unit 110 is explained. As described above, when the time-expiration signal 120 of the counter 119 is made active, the access enabling signal 109 becomes active and the system management memory unit 110 is made accessible from the outside through the bus 102, and the access to the title storing memory unit 108 becomes impossible.

Until now, explanations are on the operation of the cartridge 100 in the standing-alone state or in the state of being mounted in the software execution/reproduction unit (not shown). When, however, a title and other information are written into the cartridge 100 by the software rental apparatus of the present embodiment as described below, a specific instruction to be performed is issued through the control line 106a to the access controller 106 so that any of the title storing memory unit 108, the system management memory unit 110 and the counter 119 can be accessed freely.

In the following, descriptions will be made on an example of the operation of the software rental method and apparatus of the present embodiment using the above-described cartridge 100.

Figure 7:
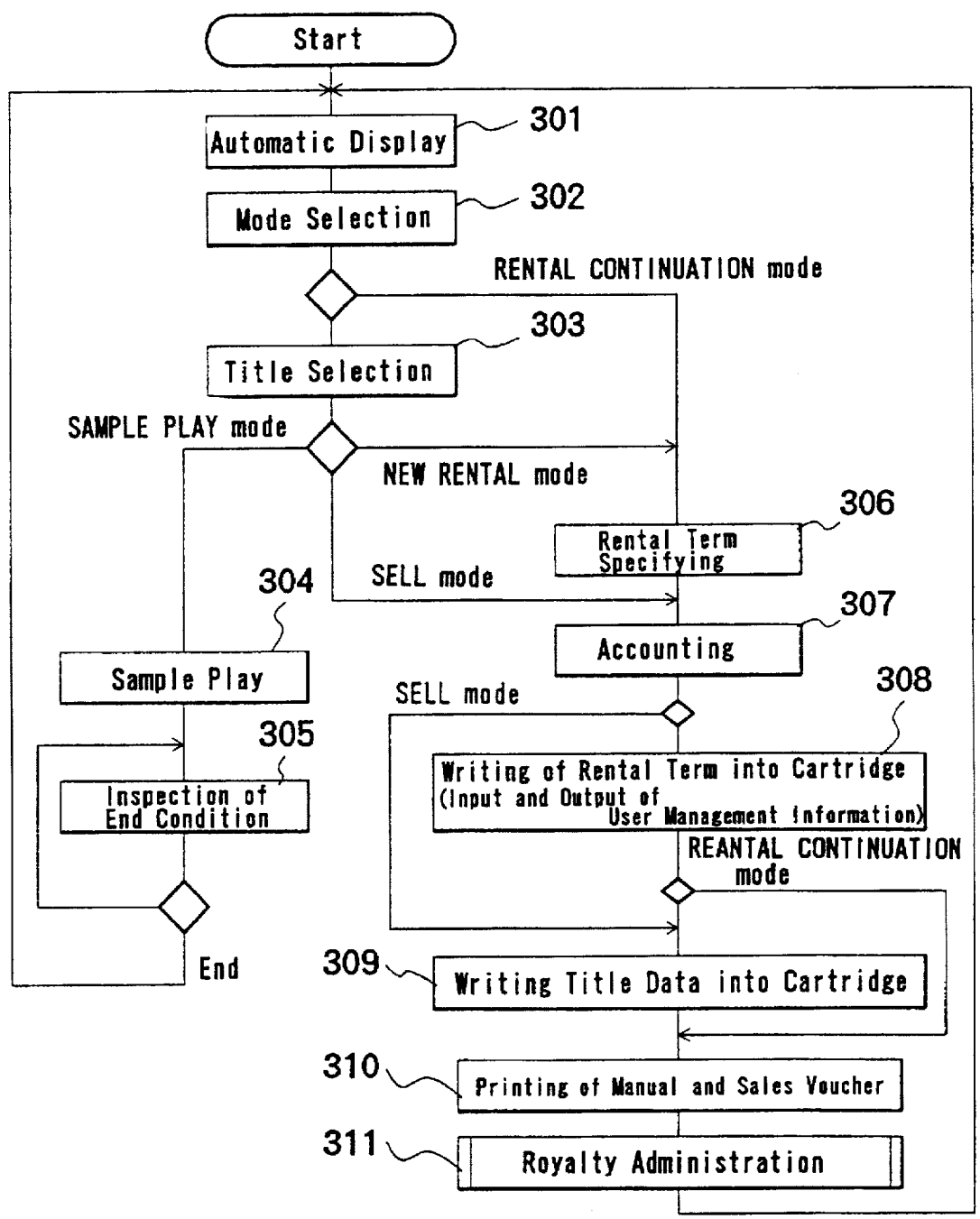
FIG. 7 is a flow chart showing an example of operation of an embodiment of the software rental method and apparatus according to the present invention.
Figure 8:
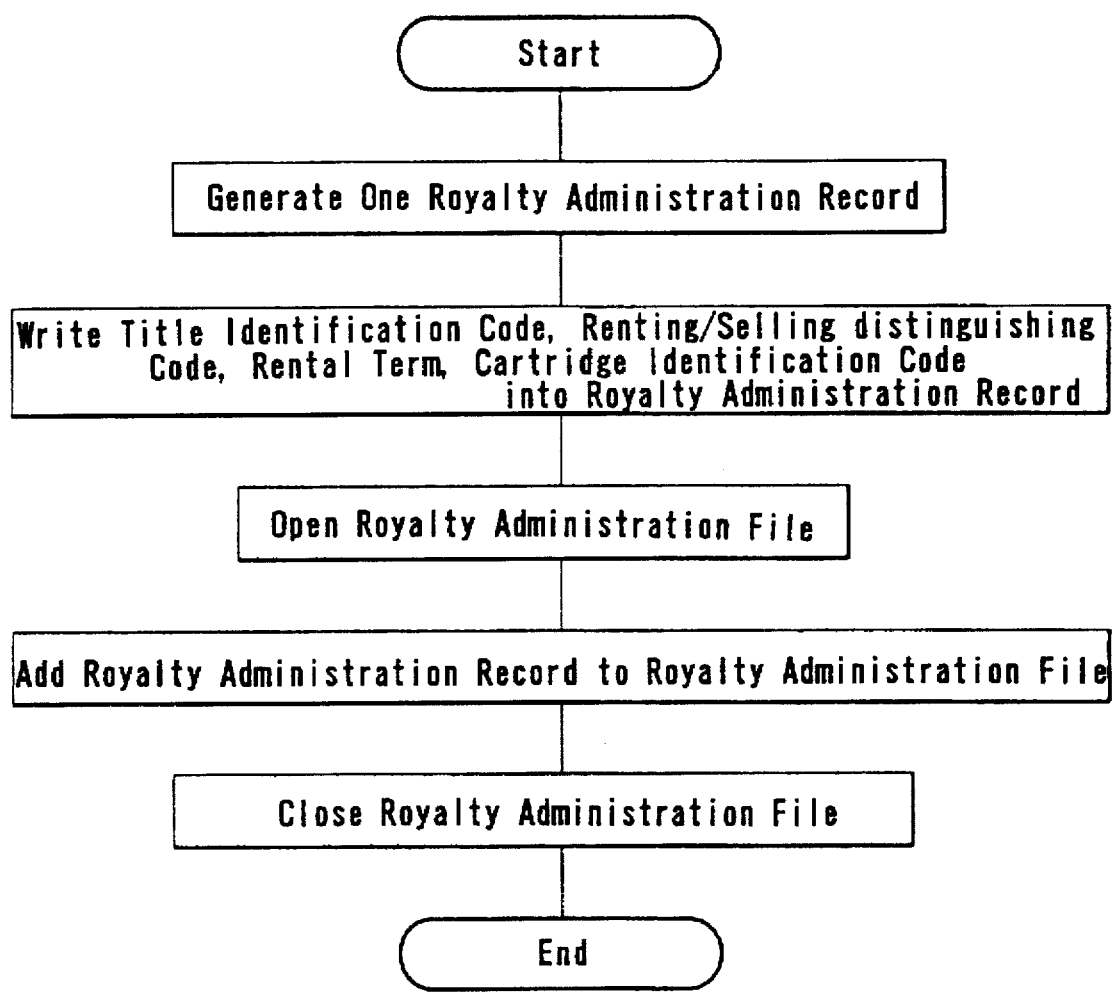
FIG. 8 is a flow chart showing an example of operation of the embodiment of the software rental method and apparatus according to the present invention.

FIGS. 7 and 8 are flow charts showing an example Operation of the method and apparatus of the software rental apparatus of the present embodiment, and FIGS. 9 to 15 are views showing examples of screens presented to the user through the display member 13a during the operation.

Figure 9:
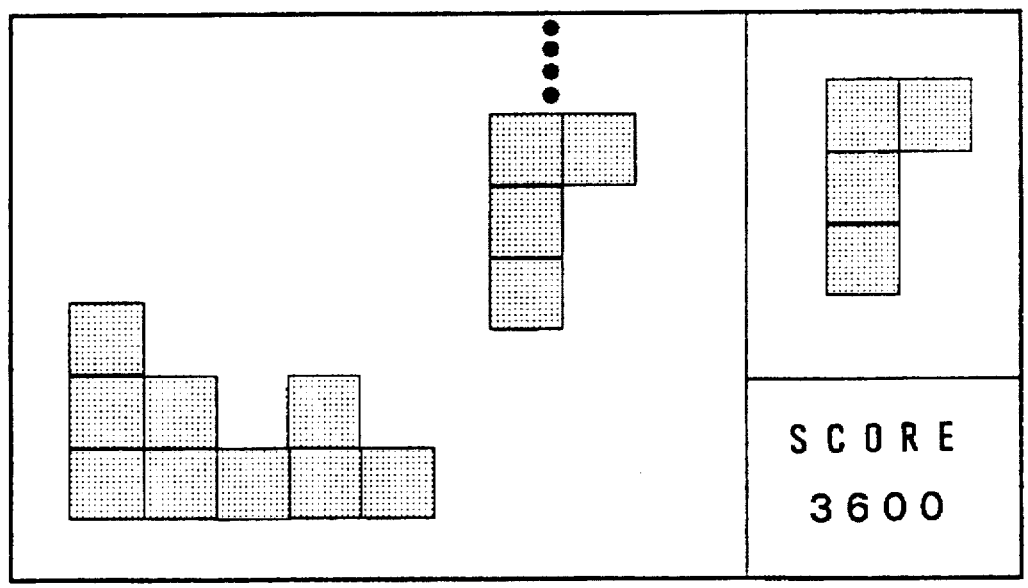
FIG. 9 is an example of a display screen showing operation of the embodiment of the software rental method and apparatus according to the present invention.

First, as shown in FIG. 7, in the starting of the software rental apparatus of the present embodiment, the automatic display step is executed (Step 301) and, as exampled in FIG. 9, a demonstration screen of a desired title is output to the display member 13a. This is performed by loading the desired title from the secondary memory 3 to the memory unit 11 for automatic display provided in the cartridge interface 10, and executing it in a display mode by the game execution control unit 8.

Figure 10:
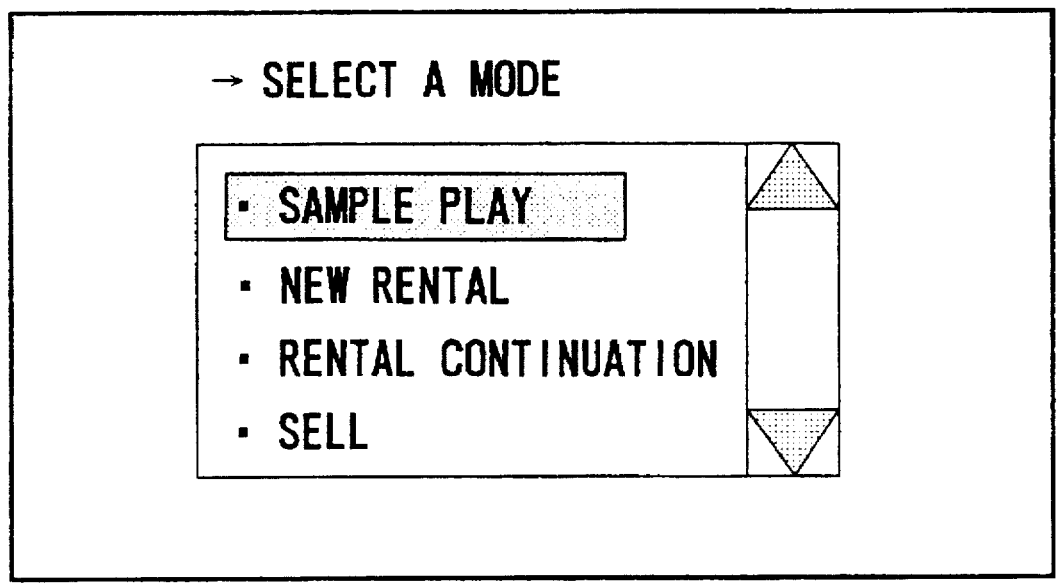
FIG. 10 is an example of a display screen showing operation of the embodiment of the software rental method and apparatus according to the present invention.

Then, with a touch of the user to, for example, the operating means 4 or 9 as a momentum, the operation is shifted to a mode selection step which displays a mode selection screen as exemplified in FIG. 10 (Step 302). In the case of the present embodiment, there are four choices in this step, including a choice of SAMPLE PLAY mode in which the user can try a desired title before purchase, a choice of NEW RENTAL mode for renting a new title, a choice of RENTAL CONTINUATION mode for renewing a rental term of an already rented title and a choice of SELL mode in which a title is sold out to the user.

Figures 11, 12:
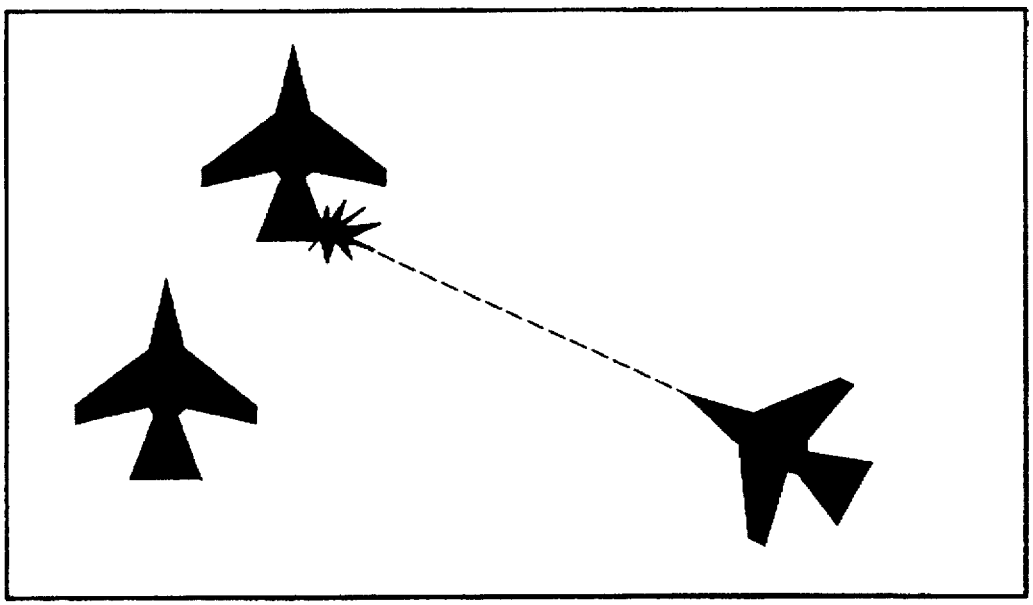
FIG. 11 is an example of a display screen showing operation of the embodiment of the software rental method and apparatus according to the present invention.
FIG. 12 is an example of a display screen showing operation of the embodiment of the software rental method and apparatus according to the present invention.

First, when other than RENTAL CONTINUATION is selected, the operation is shifted to a title selection step where a screen as exemplified in FIG. 11 is shown to the user (Step 303). Then, after the user has selected a desired title by operating the operating means 4, it is branched to the process specified at the mode selection step.

In the case that SAMPLE PLAY has been designated, the system management and control unit 1 loads the selected title from the secondary memory 3 to the memory unit 11 for automatic display, and the control is shifted to the game execution controller 8 so that a screen as exemplified in FIG. 12 and sound of the game are output to the display member 13a and the speaker 14a respectively, thus starting sample play where the user tries the specified title by using the operating means 9 (Step 304). After the user has tried the game for a limited and predetermined period of time (Step 305), the control is shifted to the system management and control unit 1, and the operation returns to the first automatic display step (Step 301).

On the other hand, in the case that NEW RENTAL has been selected in Step 302, a screen as exemplified in FIG. 13 is first presented to the user so that the user can specify a rental term of the title selected in Step 303 and, at the same time, the user is prompted to place his cartridge 100 into the cartridge connector 10d of the cartridge interface 10 (Step 306).

After the rental term is specified, a screen as exemplified in FIG. 14 is output to the display member 13a and an accounting process is executed for collecting the fee corresponding to the rental term (Step 307). In the accounting process, money is received from the user through the money inlet 5a, and, after confirmation and counting, it is received into the money receiving box 5b.

After that, first of all, the rental term is written into the cartridge 100 placed in the cartridge interface 10 (Step 308). Namely, to begin with, the system management and control unit 1 commands the access controller 106 to make the access enabling signal 118 active and thereby to open the bus buffer 123 and the direction-controlled bus buffer 124 as well as to make the counter 119 writable. This command is given to the access controller 106 through the control line 106a of the bus 102 in the cartridge 100, the control line being connected to the system bus 15. Then, the write signal is supplied to the counter 119 through the control bus 103 and, at the same time, the address of the counter 119 is designated through the address bus 104, and write data is issued on the data bus 105, whereby the counter value is written into the counter 119. The counter value is determined based on the rental term of the title and the period of the clock signal 117 supplied from the clock generator 115 to the counter 119.

After setting the counter value to the counter 119, predetermined information is further written into a user identification code storing block 112, a user information storing block 113 and the access times recording block 114 of the system management memory unit 110. This writing operation is performed in such a way that only the access enabling signal 109 to the system management memory unit 110 is made active, then, the write signal is supplied through the control bus 103 to the system management memory unit 110 to set it in a write mode, and, thereafter, a writing area is specified through the address bus 104 and write data is input through the data bus 105 into respective blocks 112, 113 and 114 of the system management memory unit 110.

Thereafter, the actual data of the title is written into the title storing memory unit 108 (Step 309). This writing operation is performed in such a way that, after the access enabling signal 107 is selectively made active, the write signal is supplied through the control bus 103 to the title storing memory unit 108 to set it in a write mode, then, the title storing memory unit 108 is addressed through the address bus 104, and thereafter, the title is transferred (copied) from the secondary memory 3 to the title storing memory unit 108.

Next, a screen as exemplified in FIG. 15 is presented to the user and, at the same time, the manual 25 of the title transferred into the cartridge 100 or forms such as a sales voucher having recorded the transaction results concerning the present rental operation are printed out by using the printer unit 6 (Step 310).

Furthermore, in the present embodiment, a royalty administration step is carried out (Step 311), wherein the royalty administrative information is recorded as basic data for sharing the received fee to the copyright holder of the title copied to the cartridge 100. This process is carried out, for example, in accordance with the flow-chart diagram shown in FIG. 8.

Through a series of the above-described processing steps, is finished the process of NEW RENTAL, where the desired title is copied into the cartridge 100 and the rental term information is set, and the operation is returned to Step 301 of the automatic display as the initial state.

On the other hand, in the case that RENTAL CONTINUATION was selected in the mode selection of Step 302, the following procedures will be followed. In this case, the title storing memory unit 108 in the cartridge 100 stores the title already copied. As a result, only the renewal of the rental term by setting a new counter value into the counter 119 and the writing of the management information on the user, etc. into the system management memory unit 110 are carried out. Accordingly, the process of writing the title data into the title storing memory unit 108 at Step 309 is omitted, and the other processes are the same as those in the case of NEW RENTAL mode.

Finally, SELL mode is described. When SELL mode is selected, control of a rental term of the title is not required. The cartridge 100 used for this mode does not need to have any rental term control system such as the counter 119, and may be constructed so as to have only a general-purpose rewritable and nonvolatile memory unit. Accordingly, the accounting process at Step 307, the process of writing a title into the cartridge at Step 309, the process of printing a manual and the like at Step 310 and the royalty administration at Step 311 are sequentially performed thereby to finish SELL (selling out) process. As a cartridge to be used for SELL mode, general portable digital recording mediums such as a compact disc-write once (CD-WO), a Mini Disc (MD), a floppy disc (FD), and a flexible magnetic disc may be employed.

For simplification, the previous description is made on the case that the screens shown in FIGS. 9 to 15 are presented on the display member 13a at respective steps to guide a user's operation. It, however, is needless to say that sound information for guidance may be provided from the speaker 14a for guiding the user if necessary.

As described above, according to the software rental method and apparatus of the present embodiment, a title that a user desires to rent and information on the control of the rental term thereof are written into a cartridge 100 and the rental term thereof is controlled autonomously within the cartridge 100, so that both a user and a rental shop do not need to follow any complicated procedure, and precise control of a rental term is possible.

In addition, a rental shop does not need to prepare circulating mediums such as cartridges by the number of titles to be sold as in the conventional technique, and, as a result, it is possible to realize a wide variety of business forms with small space and at low cost.

Also, even when demand is concentrated on a specific title, a user can certainly obtain any desired title only by bringing his own cartridge 100 so that there does not occur any trouble such as short stock which may occur in the conventional method of selling in cartridges, thus making it possible to distribute softwares properly to meet demand.

Furthermore, a plurality of software rental apparatuses may be controlled concentrically at a management center 30, resulting in cost reduction.

In addition, the cartridge 100 of the present embodiment contains, in its inside, a title (a rented software) and the system for autonomously controlling the rental term of the title. As a result, both a user and a rental shop are not required to follow any complicated procedure, thus making it possible to control the rental term precisely. Also, the cartridge 100 has the character display member 126a or the graph display member 126b for displaying a remaining rental term so that complicated procedures such as user's confirmation of the rental term and troubles such as misunderstanding leading to excess of the rental term can be prevented, making the cartridge 100 more convenient.

[EMBODIMENT 2]

Next, a cartridge 100A and a software rental apparatus according to a second embodiment of the present invention will be described with reference to FIGS. 16 and 17.

Figure 16:
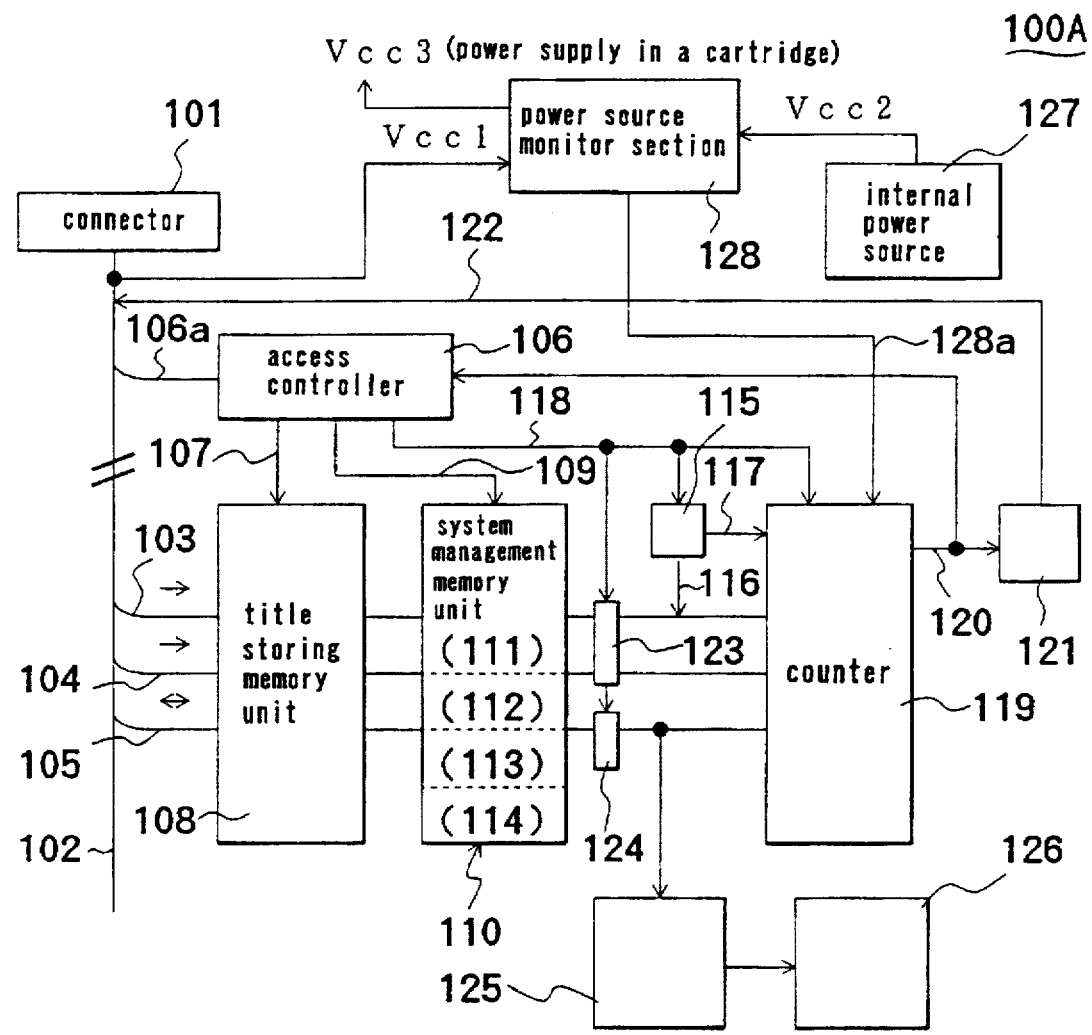
FIG. 16 is a block diagram showing another embodiment of internal structure of the cartridge according to the present invention.

FIG. 16 is a block diagram showing an example of an internal structure of the cartridge 100A of the second embodiment. In this embodiment, the cartridge 100A has an internal power source 127 comprising, for example, a chargeable secondary cell. An operating power Vcc2 from the power source 127 is supplied through a power source monitor section 128 to an access controller 106, a clock generator 115, a counter 119, a reset pulse generator 121, a counter value decoder 125 and a counter value display unit 126 as an operating power Vcc3. The power source monitor section 128 is also supplied with an operating power Vcc1 through, for example, power source pins provided in a connector 101 when the cartridge 100A is mounted into a software execution/reproduction unit not shown.

When the operating power Vcc1 is supplied from the external software execution/reproduction unit, namely, when a power source of the software execution/reproduction unit is turned ON in a state that the cartridge 100A is mounted the software execution/reproduction unit, the power source monitor section 128 selects the operating power Vcc1 preferentially and supplies it as the above-described operating power Vcc3 and, at the same time, charges the internal power source 127 in addition, a power source discrimination signal 128a is supplied from the power source monitor section 128 to the counter 119. The power source discrimination signal 128a becomes active when the internal power source 127 is selected.

In the present embodiment, the counter 119 has two modes which are switched under the control of the software rental apparatus previously described.

One mode is an elapsed-time counting mode in which the counter 119 is simply counted down by means of a clock signal 117 from the clock generator 115 independently of whether the power source discrimination signal 128a is active or not. This mode controls a predetermined rental term by counting the time elapsed simply independently of whether or not a software of the cartridge 100A is used.

The other is an accumulative use time counting mode in which, when the power source discrimination signal 128a is active, namely, when the cartridge 100A is not mounted in the software execution/reproduction unit, or when the cartridge 100A is mounted in the software execution/reproduction unit and the power source of the software execution/reproduction unit is turned OFF, the counter 119 is not counted down. On the other hand, when the cartridge 100A is mounted in the software execution/reproduction unit and its power source is turned ON, the counter 119 is counted down. This mode counts the actual use time during which the cartridge 100A is mounted and used in the software execution/reproduction unit under the state that the power source thereof is turned ON, namely, the accumulative value of the actual use time of the desired software stored in the title storing memory unit 108.

Figure 17:
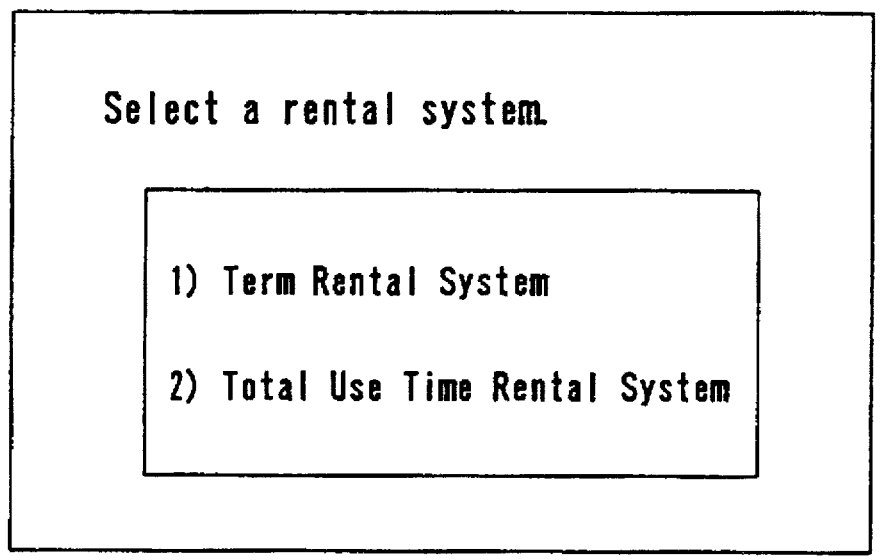
FIG. 17 is an example of a display screen showning operation of another embodiment of the software rental method and apparatus according to the present invention.

In use of the above-described cartridge 100A with the software rental apparatus of the present embodiment, when NEW RENTAL or RENTAL CONTINUATION is selected in the mode selection of Step 302 in the flow chart of FIG. 7 referred to in connection with the first embodiment, a submenu screen as exemplified in FIG. 17 is presented for a user to select a term rental system which controls simply time elapsed from beginning of renting as in the first embodiment, or a total use time rental system which controls total actual use time (accumulative use time) of a desired title stored in the cartridge 100A.

In writing rental term information into the counter 119 at Step 308 in the flow chart of FIG. 7, the elapsed-time counting mode or the accumulative use time counting mode previously described is set into the counter 119 at the same time.

It is advantageous that, with the cartridge 100A and the software rental apparatus according to the present embodiment as described above, precise accounting for a desired title stored in the cartridge 100A is possible in accordance with an actual use. Further, it is advantageous that, employing the cartridge 100A of the present embodiment, actual use can be more precisely reflected in royalty payment to copyright holders of softwares.

The present invention has been described above in detail based on the embodiments. It, however, is not limited to these embodiment, and it is needless to say that various variations can be made within the scope of the present invention.

For example, as softwares to be rented, the description has been made on game softwares in these embodiments. The present invention, however, is not limited to the field of game softwares, but can be generally applied to other softwares, including audio softwares and video softwares.

The embodiments have been described in the case where one software is rented and controlled in one cartridge 100 or 100A. However, a plurality of softwares can be rented and controlled in one cartridge 100, 100A.

Typical effects obtained by the present invention disclosed herein will be described briefly.

According to the software rental method of the present invention, complicated procedures can be eliminated and a rental term of a software can be precisely controlled. In addition, a variety of operational forms of the software rental business can be realized with small space and low cost. Further, softwares can be distributed so as to meet demand precisely.

In addition, employing the software rental apparatus of the present invention, complicated procedures can be eliminated and a rental term can be controlled precisely. Further, it is possible to supply softwares so as to meet demand precisely.

The circulating medium of the present invention does not need any complicated procedures for operation and makes it possible to control a rental term precisely.

What is claimed is:

1. A circulating medium for use with a system for renting software, said circulating medium comprising:

first memory means for storing the software;

second memory means for storing a permitted time period;

counting means for counting an accumulative time period after the permitted time period is stored;

counting control means having at least one of a means for preventing said counting means from counting the accumulative time period while the circulating medium is not mounted in a software execution unit, and a means for preventing said counting means from counting the accumulative time period while the circulating medium is mounted in the software execution unit and the software execution unit is not activated; and access control means for prohibiting access to said first memory means when the accumulative time period counted by said counting means corresponds to the permitted time period.

2. A circulating medium as defined in claim 1, wherein said counting control means includes a power source monitor means for generating a power source discrimination signal indicative of the software execution unit being activated while the circulating medium is mounted in the software execution unit.

3. A circulating medium according to claim 1, wherein said first memory means comprises a flash memory.

4. A circulating medium according to claim 1 and for use with a software rental apparatus having a circulating medium interface, said circulating medium further comprising:

an interface detachably connectable to said circulating medium interface of said rental apparatus.

5. A system for renting software, comprising:

a software rental apparatus having a circulating medium interface; and a circulating medium, having an interface detachably connectable to said circulating medium interface of said software rental apparatus, first memory means for storing the software, second memory means for storing a permitted time period, counting means for counting an accumulative time period after the permitted time period is stored, counting control means for preventing said counting means from counting the accumulative time period while said circulating medium is not mounted in a software execution unit, and further for preventing said counting means from counting the accumulative time period while said circulating medium is mounted in the software execution unit and the software execution unit is not activated, and access control means for prohibiting access to said first memory means when the accumulative time period counted by said counting means corresponds to the permitted time period.

6. The system for renting software as defined in claim 5, wherein said software rental apparatus includes third memory means for storing a plurality of softwares;

selecting operation means for selecting the software from the plurality of softwares in accordance with a selecting operation by a user;

writing means for writing the software to the first memory means; and means for setting the permitted time period in said second memory means.

7. The system for renting software according to claim 6, wherein said software rental apparatus further comprises:

means for providing a demonstration display operation of at least one of the plurality of softwares.

8. The system for renting software according to claim 6, wherein said software rental apparatus further comprises:

means for allowing the user to execute a trial operation of at least one of the plurality of softwares.

9. A software rental apparatus for use with the circulating medium according to claim 1, the software rental apparatus comprising:

means for storing a plurality of softwares;

selecting operation means for selecting a software from the plurality of softwares in accordance with a selecting operation by a user;

a circulating medium interface to which the circulating medium is detachably connectable;

writing means for writing the selected software to the first memory means of the circulating medium; and means for storing a permitted time period in the second memory means of the circulating medium.

* * * * *